United States Patent

Weist et al.

[15] 3,644,190
[45] Feb. 22, 1972

[54] CIRCUIT ARRANGEMENT FOR INDICATING AND AUTOMATICALLY ELIMINATING SHORT CIRCUITS IN ELECTROLYSIS CELLS

[72] Inventors: Martin Weist, Leverkusen; Walter Busing, Koeln-Stammheim, both of Germany

[73] Assignee: Farbenfabriken Bayer Aktiengesellschaft, Leverkusen, Germany

[22] Filed: June 30, 1969

[21] Appl. No.: 837,675

[30] Foreign Application Priority Data

July 20, 1968 Germany......................P 17 63 702.4

[52] U.S. Cl................................................204/228
[51] Int. Cl..................................................B01k 3/00
[58] Field of Search..........................................204/228

[56] References Cited

UNITED STATES PATENTS

| | | | |
|---|---|---|---|
| 3,558,454 | 1/1971 | Schafer et al. | 204/228 X |
| 3,434,945 | 3/1969 | Schmitt et al. | 204/225 X |
| 3,464,903 | 9/1969 | Shaw | 204/225 X |
| 3,476,660 | 11/1969 | Selwa | 204/228 X |
| 3,531,392 | 9/1970 | Schmeiser | 204/228 X |

Primary Examiner—John H. Mack
Assistant Examiner—D. R. Valentine
Attorney—Burgess, Dinklage & Sprung

[57] ABSTRACT

A circuit arrangement for indicating and automatically eliminating short circuits in electrolysis cells, particularly alkali metal chloride electrolysis cells. Alterations in the cell voltage caused by the appearance and disappearance of short circuits are detected by a monostable or bistable electrical circuit and fed to a short circuit indicator. The cell voltage is separated from the electrical indicator and control device by interposition of a direct current transformer.

3 Claims, 1 Drawing Figure

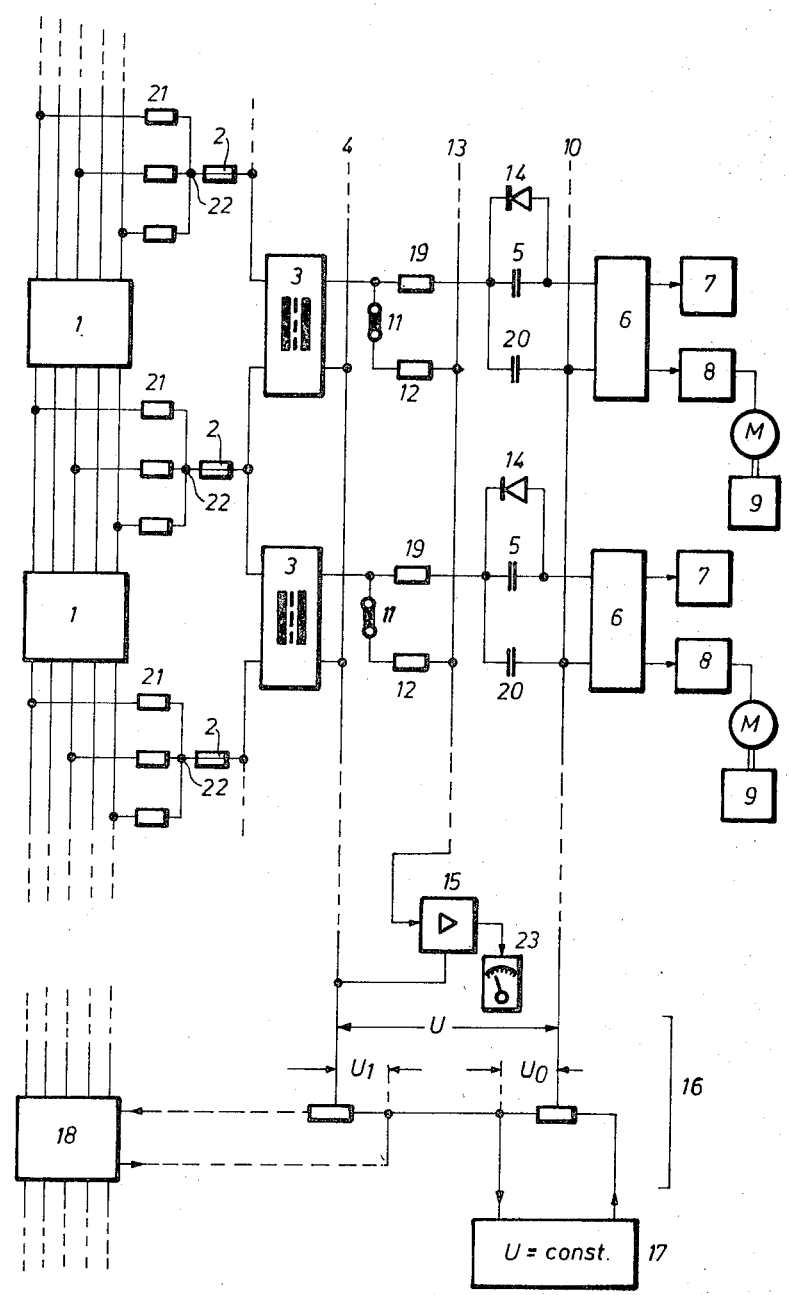
INVENTORS:
MARTIN WEIST, WALTER BÜSING.
BY
Burgess, Dinklage Sprung

CIRCUIT ARRANGEMENT FOR INDICATING AND AUTOMATICALLY ELIMINATING SHORT CIRCUITS IN ELECTROLYSIS CELLS

PREAMBLE

In one prior art device for automatically eliminating short-circuits in electrolysis cells of the type here contemplated, the mean value of the voltages of all of the electrolysis cells is used as a reference voltage and when the voltage of a particular cell deviates too much therefrom, this difference is used to obtain an indication of a short circuit condition. Upon such an indication of a short circuit, the relevant short-circuited cell is removed from those providing the original mean value.

This arrangement has disadvantages when the voltage of the cell concerned was relatively low before a short circuit was indicated; for in this case, the mean value of the cell voltage is increased as soon as the contribution of the short circuiting cell is removed.

The amount by which the mean value alters depends on the voltage difference between the cell concerned and the mean value, and the number of the cells contributing to the mean value. Under favorable circumstances, the mean value is increased by an amount which is sufficient to permit sensitively set short circuit indicators of other cells to respond. By this means, a short circuit is simulated for these cells, and the associated electrodes are raised unnecessarily high by the control device.

The electronic circuit contained in the short circuit indicator responds to a fall in cell voltage relative to a reference voltage. It thus responds not only when the cell voltage decreases and the reference voltage remains constant, but also when the cell voltage remains constant and the reference voltage increases.

THIS INVENTION

It has now been found that these disadvantages can be avoided by using, as reference voltage, a voltage synthesized from two parts: voltage $U_o$ which is not dependent on current and corresponds to the electrochemical decomposition voltage is obtained via an adjustable voltage divider from a constant voltage source, and voltage $U_1$ which is proportional to the electrolysis current and is obtained from the secondary circuit of a direct current transformer.

The value $U_1$ which is proportional to the electrolysis current is produced by all ohmic resistances inherent in parts contributing to the conduction of current.

Thus, the cell voltage U is approximately given by the formula:

$$U = U_o + U_1 = U_o + R \cdot J$$

According to a further development of the invention, a low-pass filter is arranged between the direct current transformer and the electronic indicating circuit. This filter consists of a resistance and a capacitance or is composed of a plurality of series-connected filtering elements of this type.

As a result, temporary changes in voltage are avoided. Such changes can be produced by switching operations in the electrolysis circuit, by interspersion of interference pulses on the signal-transmission path between electrolysis cells and short circuit signalling device or by harmonic vibrations in the electrolysis measuring circuit. These changes could lead to the simulation of short circuits and thus to the response of short circuit indicators.

According to a further development of the invention, the cell voltage is tapped off from a plurality of bus bars which are disposed in parallel and is conducted by way of current limiting resistances of equal size to star points. If the voltage were only to be tapped off from one bus bar, e.g., in the middle of the cell, the drop in voltage which could be detected with a short circuit by the detector would be so small under unfavorable circumstances, (this depends on the position of the electrode concerned), that the signalling device would no longer respond. This is avoided by the particular development of the invention referred to.

THE DRAWING

The attached drawing is a schematic illustration of one embodiment of this invention, and is described in the following paragraphs.

Electrolysis cells 1 are connected in series and the voltage potentials are tapped off between the cells from the two outer bus bars and the middle bus bar and conducted by way of current-limiting resistances 21 of equal size to a star point 22. This star point gives the arithmetic mean of the individual potentials. The potential differences or voltages between adjacent star points 22 are applied by way of fuses 2 to normal commercial direct current transformers 3, which serve to isolate galvanically the electrolysis circuit from the rest of the circuit. The negative terminals on the secondary side of the transformers are connected to a bus bar 4, while the positive terminals are connected through resistances 19, each of which forms a low-pass filter with a capacitor 20, and also through a capacitor 5 to the control input of a monostable electronic switching device 6.

The switching device 6 is excited from a rest state to an operating state by a rapid fall in voltage. After a time which can be preset, it then switches back automatically to the rest state, independently of whether the short circuit is still in existence or not. Connected to the switching device 6 are an indicator unit 7 and a control device 8 for controlling an anode adjuster 9. The indicator unit 7 is so arranged that it continued to indicate, independently of the duration of the input pulse, until cancelled by operators of the plant.

In the control device 8 a self-holding system which is energized as soon as an electrode short circuit brings the switching device 6 into the operating position. Independently of the length of the output pulse of the switching device 6, the self-holding system controlling the anode adjuster of the cell in question which in turn causes the anode to rise until a height difference which can be preset or an adjustment time corresponding approximately to this height difference has been reached. A height difference or adjustment time is chosen which is known from experience to be sufficiently large reliably to eliminate an anode short circuit on completion of the adjustment operation. Other manipulations, for example the resetting of the anodes at the most economical position, can be left to the operating personnel or even to another automatically operating control system. In order to make the short circuit indication arrangement insensitive to rapid fluctuations in the cell voltage which can occur in operation, for example during a change in load, it is not the prevailing cell voltage which is applied to the input of each switching device 6, but the difference between the cell voltage and a reference voltage $U$, the latter being the voltage existing on a bus bar 10. This reference voltage is produced in a summation circuit 16 and is composed of a constant value $U_o$, which corresponds to the electrolytic decomposition voltage and is taken from a constant voltage source 17, plus a value $U_1$. The voltage value $U_1$ simulates the current-dependent component of the cell voltage. It is taken from the secondary circuit of a measuring transformer 18 which measures the electrolysis current. Accordingly, $U_1$ varies in proportion to the electrolysis current. The voltage values $U_o$ and $U_1$ are adjusted so that the reference voltage, as a function of the electrolysis current, corresponds to the means of the separate cell voltages. No voltage differences occur which are sufficient to produce an incorrect response, even with relatively quick changes in load at the inputs of the switching stages 6.

In general, it is desirable to be able to check the voltages of the separate electrolysis cells with a sufficiently accurate voltage measuring instrument, for example with a digital voltmeter. These voltage values can be obtained by means of a selector switch from the secondary side of the direct current transformers, without disturbing the signalling and control arrangement which has been described, provided that the input of the voltage measuring instrument being used has a sufficiently large impedance.

Furthermore, it is generally considered to be desirable to be able to give an indication of the mean value of the voltages of all electrolysis cells which are in operation, in addition to the separate voltage values. By checking this mean value, it is possible to obtain a quick general review of the condition of the arrangement. The possibility of being able to measure the mean value directly also facilitates the appropriate adjustment of the reference voltage $U$. With the present circuit arrangement, the contributions of the separate cell voltages to the mean value are each conducted through a movable contact 11 controlled by the switching stage 6 and a resistance 12 with a narrow tolerance limit of, for example, $10^6$ ohms to a bus bar 13. From the latter, the mean value is supplied to an indicator 23 through an impedance transformer 15 having a ratio 1:1.

As soon as a switching stage 6 is excited into the operating position by a short circuit, the contact 11 is opened, and the voltage of the faulty cell is removed from the mean value formation. Because of the monostable manner of operation of the switching stage 6, caused by the capacitor 5, the switching stage would return after a short time to the rest position, the contact 11 being again closed. This is undesirable when the voltage drops are large in relation to the normal value, and especially when an electrolysis cell is, for operational reasons, deprived of current by bridging over of the current supply lines. Disrupted electrolysis cells, or cells taken out of operation, would falsify the mean value reading with their abnormal voltage contribution and thus make it useless.

In order to hold the switching stage 6 in the operating position in the cases which have been described, the capacitor 5 is bridged over by a silicon diode 14. The latter becomes conductive and cancels out the operation of the capacitor 5, as long as the relevant cell voltage is lower by more than about 0.5 volt than the reference voltage $U$.

We claim:

1. In a circuit arrangement adapted to indicate and automatically eliminate short circuits in a plurality of electrolysis cells wherein alterations in the cell voltages occasioned by the appearance and disappearance of short circuits are detected by a monostable or bistable electrical circuit by reference to a reference voltage, the cell voltages being separated from said electrical circuit by interposition of a direct current transformer; the improvement comprising:

means for supplying a synthesized voltage as said reference voltage of which synthesized voltage a part, $U_o$, is independent of the current supplied to said cells and corresponds to the electrochemical decomposition voltage and is obtained by adjustable voltage dividers from a constant voltage source, and the remaining part, $U_1$, being proportional to said current and being obtained from the secondary circuit of said direct current transformer, and a low-pass filter disposed between said direct current transformer and said electrical circuit, said filter comprising at least one resistor and a capacitor in parallel.

2. The circuit arrangement of claim 1 wherein said cell voltages are tapped off from several parallel bus bars supplying said cells and are conducted to star points through substantially equal current-limiting resistances adapted to limit the currents therethrough.

3. In a circuit arrangement adapted to indicate and automatically eliminate short circuits in a plurality of electrolysis cells wherein alterations in the cell voltages occasioned by the appearance and disappearance of short circuits are detected by a monostable or bistable electrical circuit by reference to a reference voltage, the cell voltages being separated from said electrical circuit by interposition of a direct current transformer; the improvement comprising:

means for supplying a synthesized voltage as said reference voltage of which synthesized voltage a part, $U_o$, is independent of the current supplied to said cells and corresponds to the electrochemical decomposition voltage and is obtained by adjustable voltage dividers from a constant voltage source, and the remaining part, $U_1$, being proportional to said current and being obtained from the secondary circuit of said direct current transformer, said cell voltages being tapped off from several parallel bus bars supplying said cells and being conducted to star points through substantially equal current-limiting resistances adapted to limit the currents therethrough.

* * * * *